United States Patent [19]

Ueno et al.

[11] Patent Number: 4,777,537
[45] Date of Patent: Oct. 11, 1988

[54] SIGNAL RECORDING APPARATUS AND METHOD

[75] Inventors: Katsuhiko Ueno, Tokyo; Takayuki Sasaki, Kanagawa; Koji Iijima; Masaaki Arai, both of Tokyo, all of Japan

[73] Assignee: Sony Corporation, Tokyo, Japan

[21] Appl. No.: 918,514

[22] Filed: Oct. 10, 1986

[30] Foreign Application Priority Data

Oct. 21, 1985 [JP] Japan ................................ 60-235014
Oct. 25, 1985 [JP] Japan ................................ 60-238697

[51] Int. Cl.⁴ .............................................. H04N 5/76
[52] U.S. Cl. ..................................... 358/341; 358/342
[58] Field of Search .............. 358/343, 341, 342, 907; 360/19.1, 32; 369/32, 59, 111, 50, 48, 49

[56] References Cited

U.S. PATENT DOCUMENTS

| | | | |
|---|---|---|---|
| 4,321,635 | 3/1982 | Tsuyuguchi | 369/32 |
| 4,450,488 | 5/1984 | Golding | 358/343 |
| 4,463,389 | 7/1984 | Golding | 358/343 |
| 4,583,131 | 4/1986 | Dakin | 358/343 |
| 4,587,643 | 5/1986 | Monen et al. | 369/32 |
| 4,604,655 | 8/1986 | Moriyama | 358/343 |
| 4,611,248 | 9/1986 | Honjo et al. | 358/342 |
| 4,638,377 | 1/1987 | Dakin | 358/343 |
| 4,660,100 | 4/1987 | Sugiyama et al. | 358/342 |
| 4,672,471 | 6/1987 | Gouda | 358/341 |
| 4,680,647 | 7/1987 | Moriyama | 358/343 |

Primary Examiner—Donald McElheny, Jr.
Attorney, Agent, or Firm—Philip M. Shaw, Jr.

[57] ABSTRACT

Described is a method and a recording apparatus whereby audio and video signals can be recorded on a plurality of recording tracks on the same recording medium. A series of temporarily consecutive audio signals can be recorded across a plurality of tracks. On at least the audio track, information signals including the leading track number, the next following track number and the number of the video track bearing the corresponding video signals, are recorded. The track number data of the information signals on these audio tracks are written in corresponding positions of a digital, table memory. These control code data are recorded on a predetermined control track on the recording medium such that a series of desired audio signals and the corresponding video signals can be selectively reproduced smoothly and promptly by first reading the control track and then reproducing the audio and video tracks in accordance with the control code data information.

13 Claims, 7 Drawing Sheets

FIG.4A

| Address | Track number Nt | AT | VT | Leading track number Nf | Next following track number Nn | Corresponding track number Nc |
|---|---|---|---|---|---|---|
| | $b_0$ ------ $b_5$ | $b_6$ | $b_7$ | $b_8$ ---------- $b_{13}$ | $b_{14}$ ---------- $b_{19}$ | $b_{20}$ ---------- $b_{25}$ |
| 0 | 5 | 0 | 1 | 0 | 0 | 0 |
| 1 | 6 | 0 | 1 | 7 | 0 | 7 |
| 2 | 7 | 1 | 0 | 7 | 7 | 6 |
| 3 | 10 | 1 | 0 | 10 | 11 | 0 |
| 4 | 11 | 1 | 0 | 10 | 13 | 12 |
| 5 | 13 | 1 | 0 | 10 | 13 | 0 |
| 6 | 12 | 0 | 1 | 10 | 0 | 11 |
| 7 | 8 | 0 | 1 | 9 | 0 | 9 |
| 8 | 9 | 1 | 0 | 9 | 9 | 8 |
| 9 | 2 | 1 | 0 | 2 | 3 | 0 |
| 10 | 3 | 1 | 0 | 2 | 4 | 0 |
| 11 | 4 | 1 | 0 | 2 | 4 | 1 |
| 12 | 1 | 0 | 1 | 2 | 0 | 4 |
| ⋮ | | | | | | |
| 47 | 48 | 0 | 0 | 0 | 0 | 0 |
| 48 | 49 | 0 | 0 | 0 | 0 | 0 |
| 49 | 50 | 0 | 0 | 0 | 0 | 0 |

FIG. 4B

| Address | Track number Nt<br>b0 ------ b5 | AT<br>b6 | VT<br>b7 | Leading track number Nf<br>b8 -------- b13 | Next following track number Nn<br>b14 ------------ b19 | Corresponding track number Nc<br>b20 ---------- b25 |
|---|---|---|---|---|---|---|
| 0 | 1 | 0 | 1 | 2 | 0 | 4 |
| 1 | 2 | 1 | 0 | 2 | 3 | 0 |
| 2 | 3 | 1 | 0 | 2 | 4 | 0 |
| 3 | 4 | 1 | 0 | 2 | 4 | 1 |
| 4 | 5 | 0 | 1 | 0 | 0 | 0 |
| 5 | 6 | 0 | 1 | 7 | 0 | 7 |
| 6 | 7 | 1 | 0 | 7 | 7 | 6 |
| 7 | 8 | 0 | 1 | 9 | 0 | 9 |
| 8 | 9 | 1 | 0 | 9 | 9 | 8 |
| 9 | 10 | 1 | 0 | 10 | 11 | 0 |
| 10 | 11 | 1 | 0 | 10 | 13 | 12 |
| 11 | 12 | 0 | 1 | 10 | 0 | 11 |
| 12 | 13 | 1 | 0 | 10 | 13 | 0 |
| 47 | 48 | 0 | 0 | 0 | 0 | 0 |
| 48 | 49 | 0 | 0 | 0 | 0 | 0 |
| 49 | 50 | 0 | 0 | 0 | 0 | 0 |

FIG.4C

| Address | Track number Nt<br>b0 ------ b5 | AT<br>b6 | VT<br>b7 | Leading track number Nf<br>b8 --------- b13 | Next following track number Nn<br>b14 ------------ b19 | Corresponding track number Nc<br>b20 ----------- b25 |
|---|---|---|---|---|---|---|
| 0 | 48 | 0 | 0 | 0 | 0 | 0 |
| 1 | 49 | 0 | 0 | 0 | 0 | 0 |
| 2 | 50 | 0 | 0 | 0 | 0 | 0 |
| 3 | 5 | 0 | 1 | 0 | 0 | 0 |
| 4 | 2 | 1 | 0 | 2 | 3 | 0 |
| 5 | 3 | 1 | 0 | 2 | 4 | 0 |
| 6 | 4 | 1 | 0 | 2 | 4 | 1 |
| 7 | 1 | 0 | 1 | 2 | 0 | 4 |
| 8 | 6 | 0 | 1 | 7 | 0 | 7 |
| 9 | 7 | 1 | 0 | 7 | 7 | 6 |
| 10 | 8 | 0 | 1 | 9 | 0 | 9 |
| 11 | 9 | 1 | 0 | 9 | 9 | 8 |
| 12 | 10 | 1 | 0 | 10 | 11 | 0 |
| 13 | 11 | 1 | 0 | 10 | 13 | 12 |
| 14 | 13 | 1 | 0 | 10 | 13 | 0 |
| 15 | 12 | 0 | 1 | 10 | 0 | 11 |

SIGNAL RECORDING APPARATUS AND METHOD

BACKGROUND OF THE INVENTION

1. Field of the Invention

This invention relates to a recording apparatus and method in which voice or audio signal recording tracks and video signal recording tracks can be recorded together on one and the same recording medium.

2. Description of the Prior Art

The present Applicant has already proposed in the U.S. patent application No. 06/791152, filed on Oct. 24, 1985 or in European Laying- open Publication No. 180477, published on May 7, 1986, a so-called electronc still camera adapted for recording a still image on picture, by means of which the voice can be recorded simultaneously with the still image or picture. On a disk recorded on such on electronic still camera having the function of voice recording, there are formed video signal tracks and voice or audio signal tracks in co-existence with one another. As for the recording states of audio signals, some are terminated in one track, while others are extended over plural tracks. Also, there may exist or may not exist video signals corresponding to the audio signals. The information concerning these recording states are recorded in a control data recording area in the audio signal tracks. Thus, when a series of audio signals are recorded over plural tracks, the leading track number or address and the next following track number or address are recorded in the aforementioned control data recording area. When there exist corresponding video signals, the number or address of the video track is recorded in the aforementioned control data recording area.

It is noted that the recording format of the video signal track is not designed to keep a record in the video data of address data concerning the track of the corresponding audio signals. Therefore, in reproducing the disk on which video and audio tracks exist together, when the video track on the disk is reproduced first by the reproducing head, it may be impossible to reproduce corresponding audio signals simultaneously with the video signals, even if these audio signals are present on the disk. Similar inconveniences are caused when there exist a plurality of sets of audio signals extending over plural tracks and a given sequence or a train of voice sounds accompanying a still image or scene is terminated to enter into the next sequence.

SUMMARY OF THE INVENTION

In view of the foregoing, it is a principal object of the present invention to provide a recording apparatus and method wherein control data concerning all the tracks on the disk including the aforementioned track number are densely recorded on a control track on the disk in such a fashion that, during reproduction, this control track is reproduced and a series of audio signals or corresponding video signals are optionally selected to permit smooth and prompt reproduction of the recorded contents of the disk.

For accomplishing the above object, the present invention provides a recording apparatus and method wherein at least the audio signal recording tracks and video signal recording tracks can be recorded together on one and the same recording medium, information signals including leading and next following track numbers concerning temporarily continuous audio signals recorded over plural tracks and track numbers for recording video signals corresponding to the audio signals are recorded on at least the audio signal recording track, there is provided a digital, table memory for storing the track number data of the information signals, and wherein the track number data in the table memory are subsequently recorded in a predetermined control recording track on the recording medium.

In reproducing the disk bearing these information signals, all the recording tracks on the disk are scanned for reproducing at least said information signals, these reproduced information signals are then written into corresponding table positions in a digital, table memory and the subsequent process of reproduction of the audio and video tracks is thereafter controlled on the basis of these written information signals, so that editing of the recorded information is facilitated.

In this manner, track number data recorded on the predetermined record track are read prior to reproduction such that track management during reproduction is facilitated and reproduction or editing of a sequence consisting of a series of audio signals or corresponding video signals can be performed smoothly and promptly.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIGS. 4(a) to (c) show different examples of the possible organization of the table data within the table memory.

DESCRIPTION OF THE PREFERRED EMBODIMENTS

Figure 1:
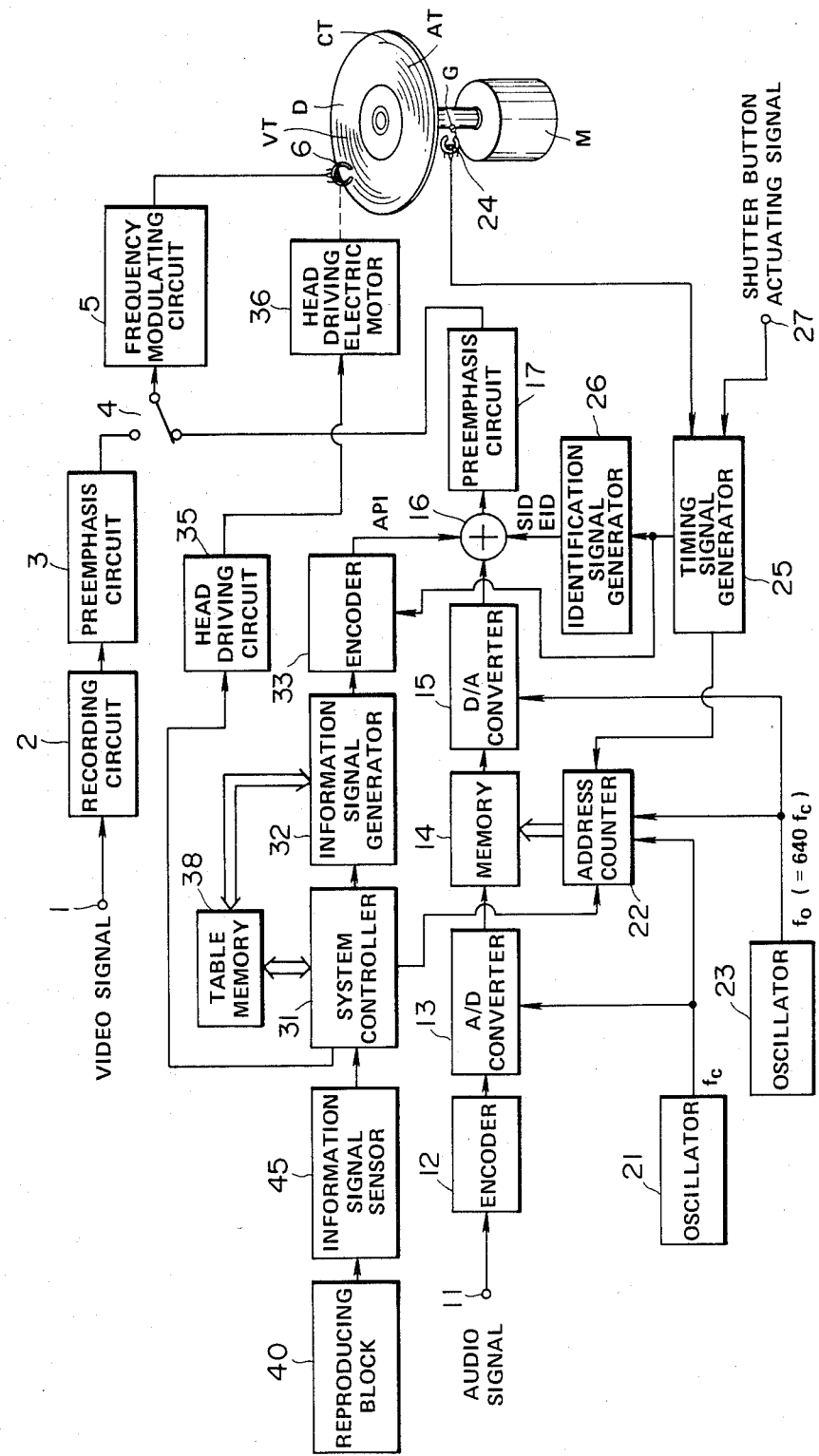
FIG. 1 is a diagrammatic block diagram showing a recording apparatus according to an embodiment of the present invention.

FIG. 1 shows in a block diagram a recording apparatus according to an embodiment of the present invention wherein the audio or voice signal recording track or "audio track" and the video signal recording track or "video track" can be recorded in co-existence on a unitary disk used as a recording medium. The technology disclosed in this block diagram is basically the same as that disclosed in the aforementioned U.S. patent application No. 06/791152.

Referring to this figure, video signals for one picture or field to be recorded are supplied to an input terminal 1 and converted in a recording circuit 2 into predetermined recording signals. These recording signals are then transmitted via a pre-emphasis circuit 3 of non-linear characteristics and a changeover switch 4 to a frequency modulation circuit 5, where they are converted into frequency modulated signals (FM signals). These FM signals are then transmitted to a magnetic head 6 so as to be recorded as video track VT on a disk D rotationally driven at e.g. 3600 rpm by an electric motor M.

Meanwhile, audio signals are supplied to an input terminal 11 and thence to an analog/digital conversion circuit (A/D converter) 13 through an encoder 12 intended for noise reduction. These signals are converted in this A/D conversion circuit 13 into digital signals that are then written into a digital memory 14. The signals read out from the digital memory 14 are transmitted to a digital/analog conversion circuit (D/A converter) 15 for conversion into analog signals. At this time, clock signals of the frequency $f_c$ used for sampling audio signals of, for example, the band width of 5 kHz, are supplied from an oscillator 21 to the A/D converter 13, while being also supplied to an address counter 22 adapted for driving and controlling the memory 14.

In the present embodoment, clock signals $f_o$, having a frequency equal to about 640 times the frequency $f_c$ of the sampling clock signals, or 640 $f_c$, are supplied from oscillator 23 to the D/A converter 15, while being also supplied to the address counter 22. Meanwhile, pulse signals at intervals of a one-sixtieth of a second based on the rotational phase of the disk as sensed by a pickup head 24 with each rotation of a magnetic piece G mounted on a rotary driving arbor of the disk D, are supplied to a timing signal generating circuit 25. On the basis of these pulse signals, timing signals are produced in the timing signal generator 25 so as to be supplied to the address counter 22. These timing signals from the timing signal generator 25 are also transmitted to an identification signal generator 26 to be later described and to an encoder 33. Shutter button actuating signals are generated by actuating a shutter button switch, not shown, and supplied at terminal 27 to the timing signal generator 25.

Thus the audio signals converted into corresponding digital signals at the A/D converter 13 in accordance with the sampling signals from the oscillator 21, are written into memory 14 with these sampling signals as write clock signals. At this time, these audio signals are written into the memory 14 by a sector or segment of a duration of e.g. 2.5 seconds, which is a quadrisection of 10 seconds. In the present embodiment, the written signals are read out from the memory 14 in accordance with signals from the oscillator 23 at a rate 640 times that used at the time of writing. Stated differently, the audio signals of the duration of 2.5 seconds are compressed along their time axis by a factor of 1/640, that is, into signals of the duration of $2.5/640 \approx 3.9$ millisecond. These audio signals compressed along the time axis correspond to the audio signals shown in FIG. 2 as later described. During this read-out time, the audio signals corresponding to the sectors SA, SB, SC and SD on the disk D of FIG. 3 as later described are read out on the basis of the pulse signals of a 1/60-second period from the pickup head 24 and at a timing sequentially dephased by one quarter of a period or by 1/240-second for each 25 seconds.

The audio signals read-out from memory 14 are converted in the D/A converter 15 into corresponding analog signals as described hereinabove before being transmitted to a signal mixer 16. To the signal mixer 16 are supplied start identification signals SID and end identification signals EID produced in an identification signal generator 26 on the basis of the timing signals from the timing signal generator 25. To the signal mixer 16 are also supplied via encoder 33 information signals API produced in an information signal generator 32 on the basis of control signals from a system controller 31. These information signals consist of the control code used for controlling the reproducing operation of the audio signals and are mixed in the mixer 16 for producing a signal having the pattern shown in FIG. 2. This figure shows one-sector signal consisting of a time-axis-compressed audio signal AS, start identification signal SID towards the front of the signal AS, end identification signal EID towards the rear of the signal AS, and the information signal API between the signals SID and AS, this information signal being used for controlling the reproducing operation of the audio signals.

It is noted that the control code data of the information signal API are comprised at least of the currently reproduced track number Nt, a leading track number Nf and a next following track number Nn in the case of a continuous voice over plural tracks as well as the video track number on which corresponding video signals are recorded (corresponding track number Nc). The code data may also include data concerning the sector-using status and the time axis compression mode, if required. The track numbers Nf and Nn indicate the number of a track Nf in which the leading portion of a series of temporary continuous audio signals are recorded when these signals are recorded over plural tracks and the number of a track Nn in which the portion consecutive to the currently recorded portion of the audio signals is to be recorded, respectively.

Figure 2:
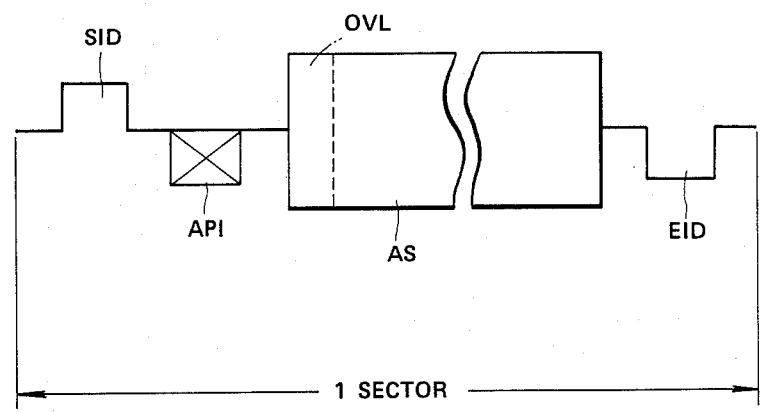
FIG. 2 shows a recording format for one-sector of audio signals.
Figure 3:
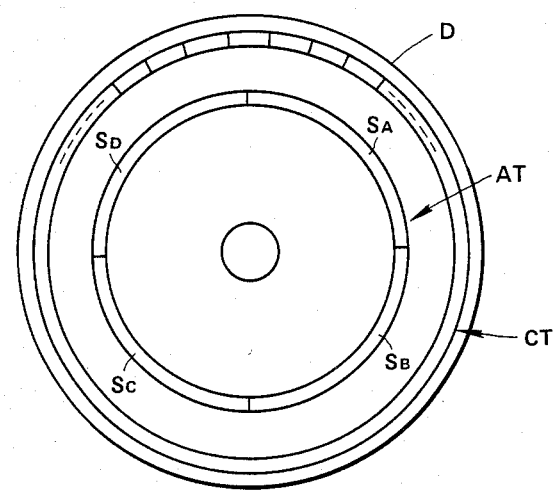
FIG. 3 is a diagrammatic plan view showing the audio and control tracks on the disk.

From the mixer 16 of FIG. 1 are outputted the aforementioned sector format signals shown in FIG. 2, these signals being transmitted via linear preemphasis circuit 17 and changeover switch 4 to the frequency modulating circuit 5. The signals from the circuit 5 are transmitted to the magnetic head 6 so as to be recorded at a rate of 4 sectors per track on the disk D. That is, four sectors SA, SB, SC and SD are recorded on one audio track AT on the disk D.

During recording of the aforementioned video and audio signals, head position control signals are supplied from system controller 31 through a head driving circuit 35 to a head driving electric motor 36. The magnetic head 6 is driven and controlled by the motor 36 so as to be thereby positioned e.g. at a track on the disk D corresponding to the current track number Nt. The aforementioned leading track number Nf, next following track number Nn and the corresponding track number Nc are transferred to and stored in a digital, table memory 38 for forming a table such as shown in FIG. 4. On at least one track, "control track" CT, at a predetermined position on the disk D, as at an outermost or innermost position thereof, there are recorded so-called control data, shown in FIG. 3 such as the track number information stored in the memory table 38.

Referring now more particularly to FIG. 4 there is shown an example of the table memory 38. Each memory block corresponding to each track is composed of 26 bits $b_6$ to $b_{25}$, with the 6 bits $b_0$ to $b_5$ being assigned to its own track number Nt, the bit $b_6$ indicating whether the track is an audio signal record track AT and the bit $b_7$ indicating whether the track is a video signal record track VT. The six bits $b_8$ to $b_{13}$ are assigned to the leading track number Nf of the audio information, the six bits $b_{14}$ to $b_{19}$ are assigned to the next following track number Nn of the audio information and the six bits $b_{20}$ to $b_{25}$ are assigned to the aforementioned corresponding track number Nc.

When a plurality of these audio tracks correspond to a single video track, the track number of the associated video track is entered only into the address of an optionally selected single audio track. Conversely, in the address corresponding to a video track, the track number of one of the associated audio tracks is entered. The table memory 38 has a capacity corresponding to the number of the tracks on the disk, such as 50 tracks, except the aforementioned control track. To these fifty blocks, there are sequentially affixed addresses, such as the addresses 0 to 49.

During recording of the video or audio signals, the number Nt of the currently recorded track, the bits indicating whether the track is an AT or VT, the leading track number Nf, the next following track number Nn and the corresponding track number Nc are written in each block at the respective predetermined bit positions, starting from the block of the more junior address number.

Figure 5:
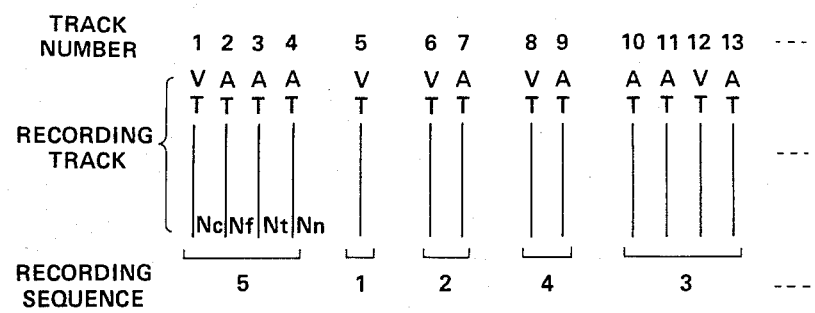
FIG. 5 diagrammatically shows an example of the contents of the recording tracks on the disk.

FIG. 4A shows the contents of the memory table in the instance wherein the recording on the record tracks on the disk D is performed in the sequence shown for example in FIG. 5. Referring to these figures, in connection with a single video signal being recorded in the fifth track, a track number '5' is written into a bit area $b_0$ to $b_5$ of the track number Nt of the block bearing the address 0. The bit $b_6$ for AT is '0', the bit $b_7$ for VT is "1", and the bit areas Nf, Nn and Nc are all '0'. Next, in connection with the video signal being recorded in the sixth track and the corresponding audio signals being recorded in the seventh track, data concerning the track number Nt=6 is written into the block of the address 1, while that concerning the track number Nt=7 is written into the block of the address 2. In this manner, the table shown in FIG. 4A is sequentially formed in accordance with the recording sequence on the disk D shown in FIG. 5.

After the end of recording, just prior to taking out the disk D from the device or just prior to power turn off, the data on the table of FIG. 4A are recorded as so-called control data on the control track CT on the disk D. It will be noted that, although the data can be written on the control track CT each time each sequence is terminated, by starting from the junior address number in regular order, it is also possible to record the data at a time after the recording of the series of sequences such as those for 50 tracks is terminated. Taking the instance of FIG. 5 as an example, while the data can be written after each sequence such as [1, 2, 3, 4], [5], [6, 7] or [8, 9] is terminated, it is also possible to record the data at a time after a series of sequence such as [1, 2, 3, 4 . . . , P, 11, 12, 13] are terminated.

It is also noted that, as shown in FIG. 5, the data order on the disk is not necessarily constant but may frequently be disturbed in the course of the repetitive recording, erasing and reproducing operations.

Figure 6:
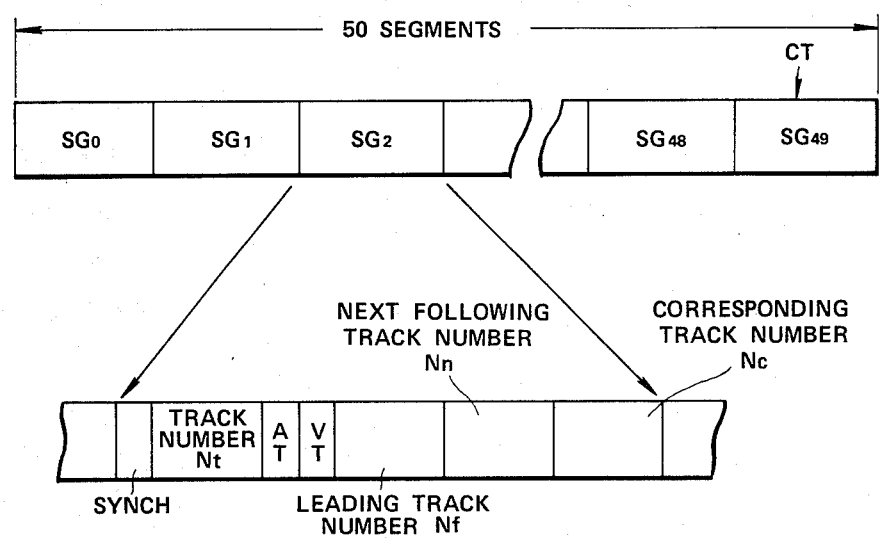
FIG. 6 shows an example of the recording format on the control track.

As shown in FIG. 6, the control track CT is divided into 50 segments $SG_0$ to $SG_{49}$ corresponding to the tracks such as the 50 tracks on the disk D. In each of these segments, there comes first an area for sync signals, followed by record areas for the data Nt, AT, VT, Nf, Nn and Nc corresponding to one block in the table memory. In this case, it can be considered that the segment SG k of an address k corresponds to the block bearing the address k in the aforementioned table memory and that the data in the block are recorded in the segment SG k.

During recording of the table data in the control track CT, the data in a table memory 38 is read out by the system controller 31 and an information signal generator 32 so as to be processed into control data signals, that is, signals having the format shown in FIG. 6. These control data signals are transmitted via encoder 33 and mixer 16 to preemphasis circuit 17. The output signals from the preemphasis circuit 17 are transmitted via changeover switch 4 to FM circuit 5. Simultaneously, head position control signals from the system controller 31 are transmitted via head driving circuit 35 to the head driving electric motor 36 such that the magnetic head 6 is shifted to a position of the control track CT on the disk D, such as a position of the outermost track on the disk. The signals from the FM circuit 5 are supplied to the magnetic head 6 for recording on the control track.

As will be described in further detail hereinafter, prior to the recording on the control track CT, the data order in the table memory 38 can be selectively rearranged so that the track number sequence is as shown for example in FIGS. 5 and 4A (organized by recording sequence), FIG. 4B (organized by track number Nt) or FIG. 4C (organized by leading track number Nf).

It is now assumed that a disk D is only partially recorded and recording is to be performed on a vacant or unrecorded track. In this case, after the disk D has been loaded into a recording apparatus such as an electronic still camera and the camera is switched from the power turn off state to the standby state for recording, at least the control track CT is reproduced by a reproducing block 40, the control data such as the track number etc. are read out by the information signal sensor 45, and the thus read-out data are written into the table memory 38 through system controller 31.

Figure 7:
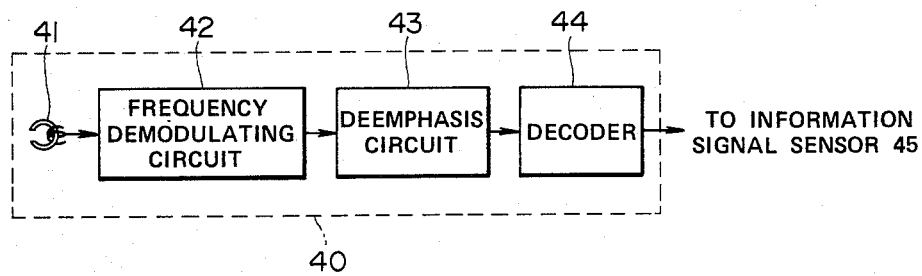
FIG. 7 is a block diagram showing an example of the reproducing block in FIG. 1.

The reproducing block 40 is constructed for example as shown in FIG. 7. The reproducing signals from a reproducing magnetic head 41, which can be the same as the magnetic head 6, are frequency demodulated in a frequency demodulator 42 before being transmitted to a decoder 44, which has characteristics that are reverse to those of the encoder 33, by way of a de-emphasis circuit 43, which has characteristics that are reverse to those of the preemphasis circuit 17 of the aforementioned voice recording system. The output signals from the decoder 44 are supplied to the information signal sensor circuit 45 shown in FIG. 1.

This feature is useful for an electronic still camera of the type in which the disk can be mounted or dismounted after partial recording on the disk D is terminated, or of the type in which the data stored in the table memory 38 is erased at the time of power turn off. The using or recording state of the recording tracks on the disk D is written at all times in the table memory 38 before the signal recording, resulting in better track control or management and prevention of the inconvenience that new signals are inadvertently recorded on the pre-recorded tracks.

EXAMPLE OF THE REPRODUCING APPARATUS

Figure 8:
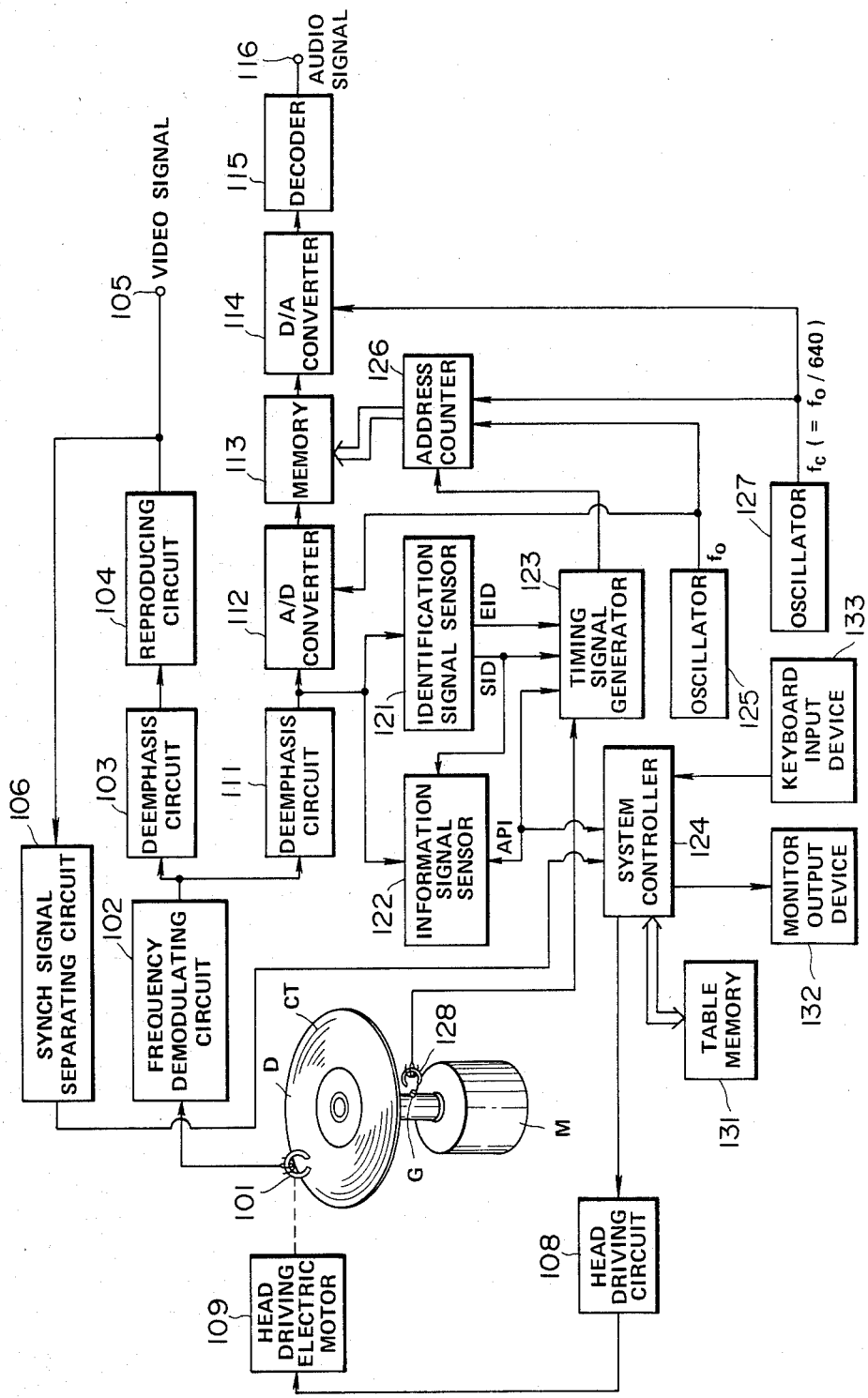
FIG. 8 is a block diagram showing an example of the reproducing apparatus adapted for reproducing the disk recorded by the recording apparatus.

When reproducing the disk D bearing the aforementioned recording, a reproducing apparatus such as shown in FIG. 8 may be used.

Referring to this figure, prior to reproduction of the audio or video signals, the system controller 124 operates to shift the magnetic head 101 to the predetermined position of the control track CT through the head driving circuit 108 and the head driving electric motor 109 in such a manner as to reproduce the control data including the aforementioned track number data recorded on the control track CT. Thus the reproducing signals from the magnetic head 101 obtained upon scanning the control track CT are transmitted via frequency demodulating circuit 102 and deemphasis circuit 111 to an information signal sensor 122. The reproducing signals are processed by the information signal sensor 122 into data signals indicating the track number Nt, Nf, Nn and Nc in the table so as to be sequentially written by system controller 124 in the associated positions of the digital, table memory 131. In this case, the table memory 131 consists of 50 blocks each containing 26 bits similarly to the aforementioned memory 38. When the record contents of the segments $SG_0$ to $SG_{49}$ of the control track CT are written into the blocks of the addresses 0 to 49 of the control track CT, respectively, the table as shown for example in FIG. 4A is formed in the table memory 131. Thus, in a dual type apparatus that can be used simultaneously as a recording unit and as a reproducing unit, a table memory can be used in common to these units.

The contents of the table shown in FIG. 4 are read out from memory 131 via system controller 124 so as to be displayed in a monitor output device 132 such as a CRT display device. In this case, the table per se shown in FIG. 4A or a portion thereof can be displayed. By consulting the table display, the user or operator can use a keyboard input device 133 to select the image and voice of the desired sequence and then perform a data inputting operation to the system controller 124 for reproducing the selected voice and image. It is noted that display of the reproducing image and the data from the system controller 124 can be effected by using the same monitor outputting device 132.

It is assumed that the track number Nt of the table of FIG. 4 is to be designated as an example of the reproducing operation by the keyboard inputting device 133. The system controller 124 reads the memory block of the designated track number Nt on the table of FIG. 4 in the table memory 131. If the designated track is the audio track, system controller 124 controls the head driving circuit 108 for sequentially reproducing from the track of the leading track number Nf such that a series of audio signals corresponding to the sequence including the designated track are reproduced.

If the designated track is a video track, since the leading track number Nf of the corresponding audio signal is written into the associated memory block of the table, the sequence can be reproduced from the leading part thereof. In the table shown in FIG. 4, since the tracks are organized by units of sequences, the track can be designated by specifying the sequence number, which may for example be the leading track number Nf itself or a new number in accordance with the recording order shown in FIG. 5. In this manner, the desired sequence can be reproduced instantaneously.

In this case, the contents of the table memory can be displayed on a minotor 132, as shown in FIG. 4A or, after sorting, in the order of the track number Nt as shown in FIG. 4B. Such sorting can also be in the order to the leading track numbers of the voice sequence as shown in FIG. 4C. The order of display can be changed in accordance with the operation that is performed on the keyboard 133. It is noted that, in FIGS. 4A to 4C, there is shown various alternative states of the data contents corresponding to the addresses in the table memory 131, these data contents being displayed directly. However, it is also possible to provide a separate buffer memory, with the contents of table memory 131 being constant at all times and the data contents in the buffer memory being display with the changes in the order of the display.

The other components of the reproducing apparatus shown in FIG. 8 are provided for performing an operation which is the reverse of the aforementioned operation of the recording apparatus shown in FIG. 1 for restoring the original video or audio signals before recording thereof.

Thus, referring to FIG. 8, signals reproduced by the magnetic head 101 from the disk D are transmitted to a frequency demodulating circuit 102. When the magnetic head 101 is scanning over the video track VT bearing the recorded video signals, demodulated signals are taken out as video signals at the output terminal 105 through the reproducing circuit 104 and a deemphasis circuit 103 having non-linear characteristics.

When the magnetic head 101 is scanning the track bearing the recorded audio signals, demodulated signals are supplied via deemphasis circuit 11 of linear characteristics to an A/D converter 112 while also being supplied to an identification signal sensor circuit 121 and an information signal sensor circuit 122. The start identification signal SID and end identification signals EID sensed at an identification signal sensor 121 are supplied to a timing signal generator 123. The start identification signals SID are supplied to the information signal sensor circuit 122, while the information signals API controlling the reproducing operation of the audio signals sensed at the information signal sensor circuit 122 are also supplied to the timing signal generator 123. In addition, the information signals API and the video sync signal from the sync separating circuit 106 are supplied to the system controller 124, where control of the overall system is performed.

The time compressed audio signals converted into digital signals by the A/D converter 112 are written into memory 133. The signals read-out from memory 113 are transmitted to A/D converter 114 and thereby converted into corresponding analog signals. it will be noted that signals having a frequency $f_o$ equal to the frequency of the aforementioned oscillator 23 are supplied from oscillator 125 to the A/D converter 112 while also being supplied to address counter 126 driving and controlling the aforementioned memory 113. The signals having the frequency $f_c$ equal to that of the aforementioned oscillator 21, that is, the signals of the frequency equal to 1/640 th of that of the signals from the oscillator 125 are supplied from the oscillator 127 to the A/D converter 114 while being also supplied to the address counter 126.

Timng signals based on the pulse signals of the 1/60 second period from the pickup head 128 are generated at timing signal generator 123 so as to be supplied to the address counter 126. The writing to memory 113 is performed responsive to signals from the oscillator 125 while the reading to memory 113 is performed responsive to signals from oscillator 127 at a rate equal to 1/640 th of that used during writing. Stated differently, audio signals are expanded along their time axis by a factor of 640 and restored to the original length by an operation which is the reverse of that performed a the time of recording. The signals thus expanded along their time axis are transmitted from the D/A converter 114 so as to be taken as continuous audio signals at the output terminal 116 through decoder 115 which is intended for noise reduction.

OTHER CONSTRUCTIONAL EXAMPLE

It is noted that the present invention is not limited to the above described example. For example, in the case of a recording apparatus of the type in which the disk cannot be taken out until the recording of the totality of the tracks on one disk is terminated and the data in the table memory is preserved at the time of power turn off, such as an electronic still camera, the reproducing block 40 and the information signal sensor circuit 45 shown in FIG. 1 can be dispensed with.

Since the data concerning the leading track number, the next following track number, and track number of the corresponding video signals for a series of temporarily consecutive audio signals are densely recorded on the control track which is at a predetermined track location, the control track can be reproduced at the time of signal reproduction for writing into the table memory, and an access had to the track while consulting the table. In this manner, a series of audio signals and the corresponding video signals are reproduced smoothly and promptly and track control or management is facilitated while providing freer access to the tracks. In addition, track control or management in the case of recording signals in a vacant or unrecorded track of a partially prerecorded disk is also facilitated or can be performed more reliably, while inadvertent recording is effectively prevented.

Moreover, an editing operation is facilitated by having the table memory 131 without the necessity of using the control track CT during the editing process. The table shown in FIG. 4B or the table shown in FIG. 4C is read from memory 131 through system controller 124 so as to be displayed on a monitor output device 132 such as CRT display. At this time, the table shown in FIG. 4B, for example, can be directly displayed or a part of the table shown in FIG. 4B can be displayed. By consulting the table display, the user or operator can select the image or voice of the desired sequence and perform an inputting of the information by employing a keyboard inputting device 133 for causing the selected voice and image to be reproduced. It is noted that display of the reproduced image and of the data from system controller 124 can be effected on the same monitor outputting device.

As an example of the selective reproducing operation, when the track number Nt of the table of FIG. 4B is designated through the keyboard input device 133, system controller 124 reads out the memory block of the designated track number Nt on the table of FIG. 4B of the table memory 131. When the designated track is the voice track, system controller 124 controls the head driving circuit 108 for sequentially reproducing from the track of the leading track number Nf so as to produce a series of audio signals belonging to the sequence containing the designated track. When the designated track is the video track, since the leading track number Nt of the corresponding audio signals is written in the memory block of the table, reproduction can be achieved starting at the leading end of the sequence.

In still another embodiment of the invention, upon reproduction all of the recording tracks on the disk are scanned for reproducing at least the information signals and these reproduced information signals are then written into corresponding table positions in the digital, table memory. Subsequently, the process of reproducing the audio and video tracks is thereafter controlled on the basis of these written information signals, so that editing of the recorded information is facilitated.

Although the present invention has been shown and described with respect to preferred embodiments, various changes and modifications which are obvious to a person skilled in the art to which the invention pertains are deemed to lie within the spirit and scope of the invention.

What is claimed is:

1. An improved signal recording apparatus of the type in which a plurality of fields of video signals are sequentially recorded on a corresponding plurality of concentrically arranged tracks on a rotary recording medium, and selected ones of the remaining tracks on the recording medium are arranged to have audio signal segments recorded thereon, some of which are intended to be reproduced sequentially, wherein the improvements in the recording apparatus comprise:
   (a) means for time-compressing the audio signal segments;
   (b) means for generating control code data for controlling a reproduction sequence of audio signal segments recorded in said plurality of recording tracks; said control code data including address data indicating a track number and address on said rotary recording medium, data for discriminating whether a track being reproduced is one of the tracks having an audio signal segment which is intended to be reproduced in a sequence with other recorded audio signal segments, and data indicating a track number of a video signal segment corresponding to the audio signal segment being reproduced;
   (c) table memory means for storing said control code data including said address data, said discriminating data and said track number data;
   (d) means for recording said control code data in predetermined portions of said respective audio tracks together with said time compressed audio data; and
   (e) means for recording said control code data stored in said table memory means on a control track at a predetermined location on said rotary recording medium.

2. A signal recording apparatus according to claim 1, wherein the means for recording said control code data reads out said control code data stored in said table memory means and records it on said control code track when the recording of said time-compressed audio signal segment and said video signal segment for a given scene corresponding thereto is completed.

3. A signal recording apparatus according to claim 1, wherein the means for recording said control code data reads out said control code data stored in said table memory means and records it on said control code track when the recording of said time-compressed audio signal segment and said video signal segment for a given series of scenes corresponding thereto is completed.

4. A signal recording apparatus according to claim 2 in which said control code data stored in said table memory means is read out and recorded on said control code track before said rotary recording medium is removed from said recording apparatus.

5. A signal recording apparatus according to claim 1, in which said means for time compressing said audio signal segments includes audio signal memory means, means for inputting audio data in digital form into said audio signal memory means, a write/read address counter for controlling said audio signal memory means; first and second clock signal generators for respectively generating first and second clock signals and supplying them to said write/read address counter, said first clock signal corresponding to a selected clock frequency and having a frequency substantially less than said second clock frequency, whereby said write/read address counter generates write addresses at said first frequency and read addresses at said second frequency whereby said digital audio signal segments are written into said audio signal memory means at said first clock signal frequency and are read out of said audio signal memory at the higher, second clock signal frequency.

6. Apparatus according to claim 5, in which said second clock signal generator produces said second clock signal at a frequency 640 times that of said first clock signal.

7. In combination with a rotary recording medium on which a plurality of fields of video signals are sequentially recorded on a corresponding plurality of concentrically arranged tracks on said rotary recording medium, and selected ones of the remaining tracks on the recording medium are arranged to have time compressed audio signal segments and control code data signals recorded thereon, said control code data signals including address data indicating a track number and address on said rotary recording medium and data for discriminating whether a track being reproduced is an audio track or a video track, a signal reproducing apparatus of the type which reproduces signals from said rotary recording medium, the reproducing apparatus comprising:
  (a) decoder means for initially reproducing said control code data signals from the remaining tracks upon the beginning of reproduction;
  (b) table memory means for storing control code data from said decoder means, said control code data including said address data, said discriminating data and said track number data;
  (c) display means for displaying the control code data stored in said table memory means;
  (d) means for selectively thereafter reading said video data and said time compressed audio data from said rotary recording medium in accordance with the display control code data; and
  (e) means for time-expanding the time compressed audio signal segments read from said rotary recording medium.

8. In a method of sequentially recording a plurality of fields of video signals on a plurality of concentrically arranged tracks on a rotary recording medium and audio signal segments, some of which are intended to be reproduced in sequence, on selected ones of the remaining tracks on the recording medium, the improvement comprising the steps of:
  (a) time-compressing the audio signal segments before recording them;
  (b) generating control code data for controlling a reproduction sequence of audio signal segments recorded in said plurality of recording tracks; said control code data including address data indicating a track number and address on said rotary recording medium, data for discriminating whether a track being reproduced is one of the tracks having a sequential audio signal segment, and data indicating a track number of a video signal segment corresponding to the audio signal segment being reproduced;
  (c) storing said control code data including said address data, said discriminating data and said track number data;
  (d) recording said control code data in predetermined portions of said respective audio tracks together with said time compressed audio data; and
  (e) recording said stored control code data on a control track on said rotary recording medium.

9. A method of signal recording according to claim 8, wherein the step of recording said control code data includes the steps of reading out said stored control code data and recording it on said control track when the recording of said time-compressed audio signal segment and said video signal segment for a given scene corresponding thereto is completed.

10. A method of signal recording according to claim 8, comprising the further steps of reading out said stored control code data and recording it on said control track before said rotary recording medium is removed from said recording apparatus.

11. A method of signal recording according to claim 8, wherein the step of time compressing said audio signal segments includes the further steps of generating first and second clock signals, said first clock signal corresponding to a selected clock frequency and having a frequency substantially less than said second clock frequency, and writing said audio signal segments into a digital memory at said first clock frequency and reading out said audio signal segments from the digital memory at said second clock frequency.

12. A method of signal recording as recited in claim 11, wherein said second clock signal has a frequency 640 times that of said first clock signal.

13. A signal reproducing method for use with a rotary recording medium on which a plurality of fields of video signals are sequentially recorded on a plurality of concentrically arranged tracks on said rotary recording medium, and selected ones of the remaining tracks on the recording medium are arranged to have time compressed audio signal segments and control code data signals recorded thereon, said control code data signals including address data indicating the track numbers of related audio and video tracks on said rotary recording medium and data for discriminating whether a track being reproduced is an audio track or a video track, the signal reproducing method comprising the steps of:
  (a) initially reproducing said control code data from the remaining tracks;
  (b) storing said reproduced control code data, said control code data including said address data, said discriminating data and said track number data;
  (c) displaying the stored control code data and selectively controlling a reproduction sequence of said audio and video signals recorded in said plurality of recording tracks in accordance with the displayed control code data; and
  (d) time-expanding the reproduced, time compressed audio signal segments.

* * * * *